Figure 1:
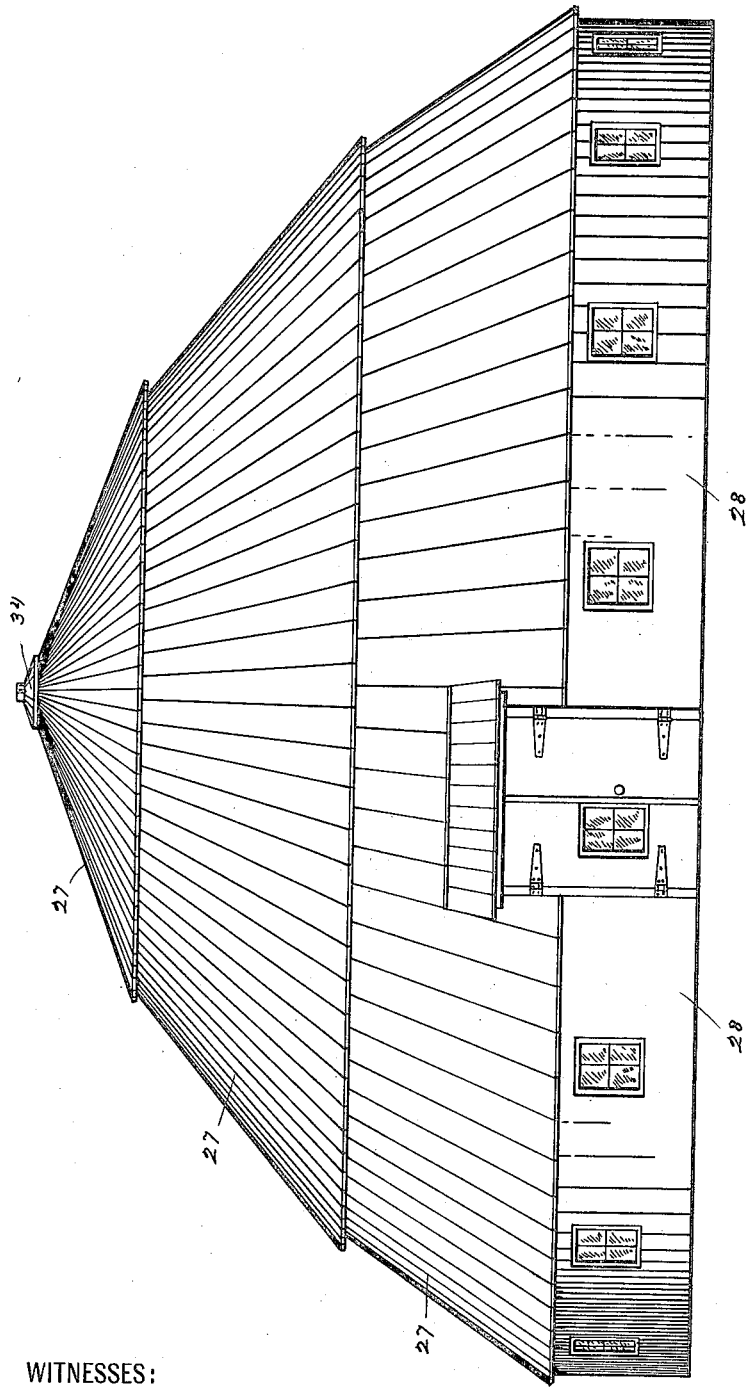

J. R. BUCKWALTER.
BARN CONSTRUCTION.
APPLICATION FILED FEB. 24, 1909.

942,884.

Patented Dec. 14, 1909.
4 SHEETS—SHEET 1.

WITNESSES:
E. H. Kreider
Mabel L. Lefevre.

INVENTOR
John R. Buckwalter,
BY John J. Thompson
ATTORNEY

J. R. BUCKWALTER.
BARN CONSTRUCTION.
APPLICATION FILED FEB. 24, 1909.

942,884.

Patented Dec. 14, 1909.
4 SHEETS—SHEET 4.

WITNESSES:
E. H. Kreider
Mabel L. Lefevre.

INVENTOR
John R. Buckwalter,
BY
John J. Thompson
ATTORNEY

UNITED STATES PATENT OFFICE.

JOHN R. BUCKWALTER, OF PALMYRA, MISSOURI.

BARN CONSTRUCTION.

942,884.

Specification of Letters Patent.

Patented Dec. 14, 1909.

Application filed February 24, 1909. Serial No. 479,835.

*To all whom it may concern:*

Be it known that I, JOHN R. BUCKWALTER, a citizen of the United States, residing at Palmyra, in the county of Marion and State of Missouri, have invented certain new and useful Improvements in Barn Construction, of which the following is a specification, reference being had therein to the accompanying drawing.

This invention relates to a semi-portable barn or other building construction, and has for its object to produce a circular barn that will be storm-proof, economical as to material, readily erected by unskilled labor, as the parts entering into its construction may be erected and joined together at a distance from their place of manufacture without additional fitting.

Another object of the invention is to produce a barn that is convenient for filling with produce, caring for the live stock therein contained, readily cleaned, and sanitary.

Still another object of my invention is to construct a circular barn in which the central portion is devoted to the storage of produce which rests upon the floor or ground, thus doing away with heavy and expensive framework to support mows, etc., as by my novel construction the entire structure is suspended and supported upon guy-ropes or cables, which radiate from a central post and have their ends suitably anchored in the ground. A further advantage of this construction is that the feed storage being located in the center of the barn and the live stock being placed near the outer circumference of the barn, with a circular passage between their stalls and the side wall, the labor required for feeding the stock is reduced to a minimum; and also by providing sufficient space between the stock and the outer wall, a vehicle may be driven entirely around the barn within this passage to remove the refuse. And further, the live stock may be driven in and out through this same circular passage, thus keeping them at all times separated from the feed.

With these and other objects in view my invention consists in certain construction and combination of parts as will hereinafter be fully described and claimed, and further illustrated in the accompanying drawings, which form a part of this application, and in which corresponding parts are indicated by like reference figures in all of the views, but it is fully understood that while I have here described my invention as herewith illustrated, that I do not confine myself to the exact design as shown, as slight changes may be made within the scope of the appended claims without departing from the spirit of the invention.

Figure 2:
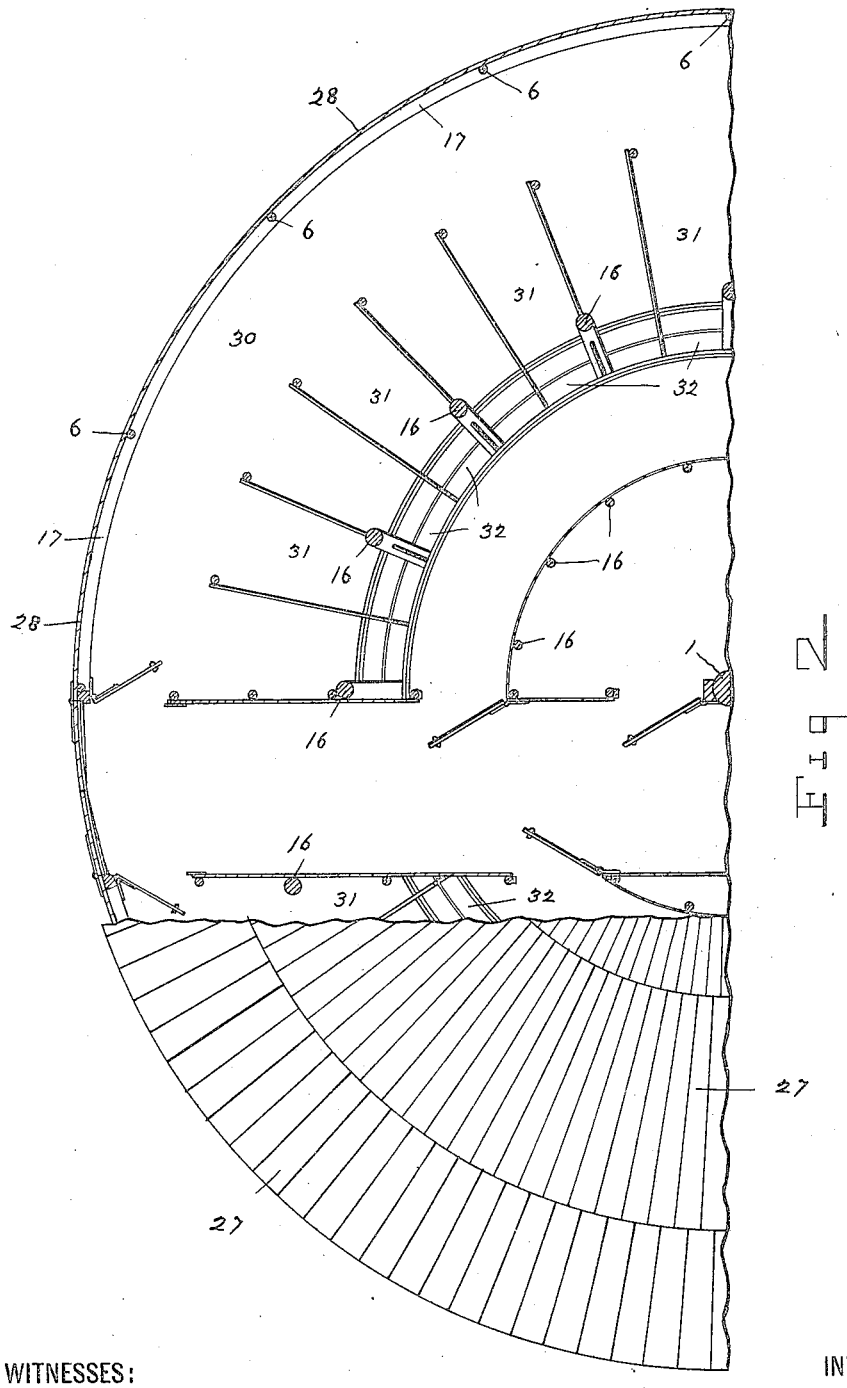
Figure 3:
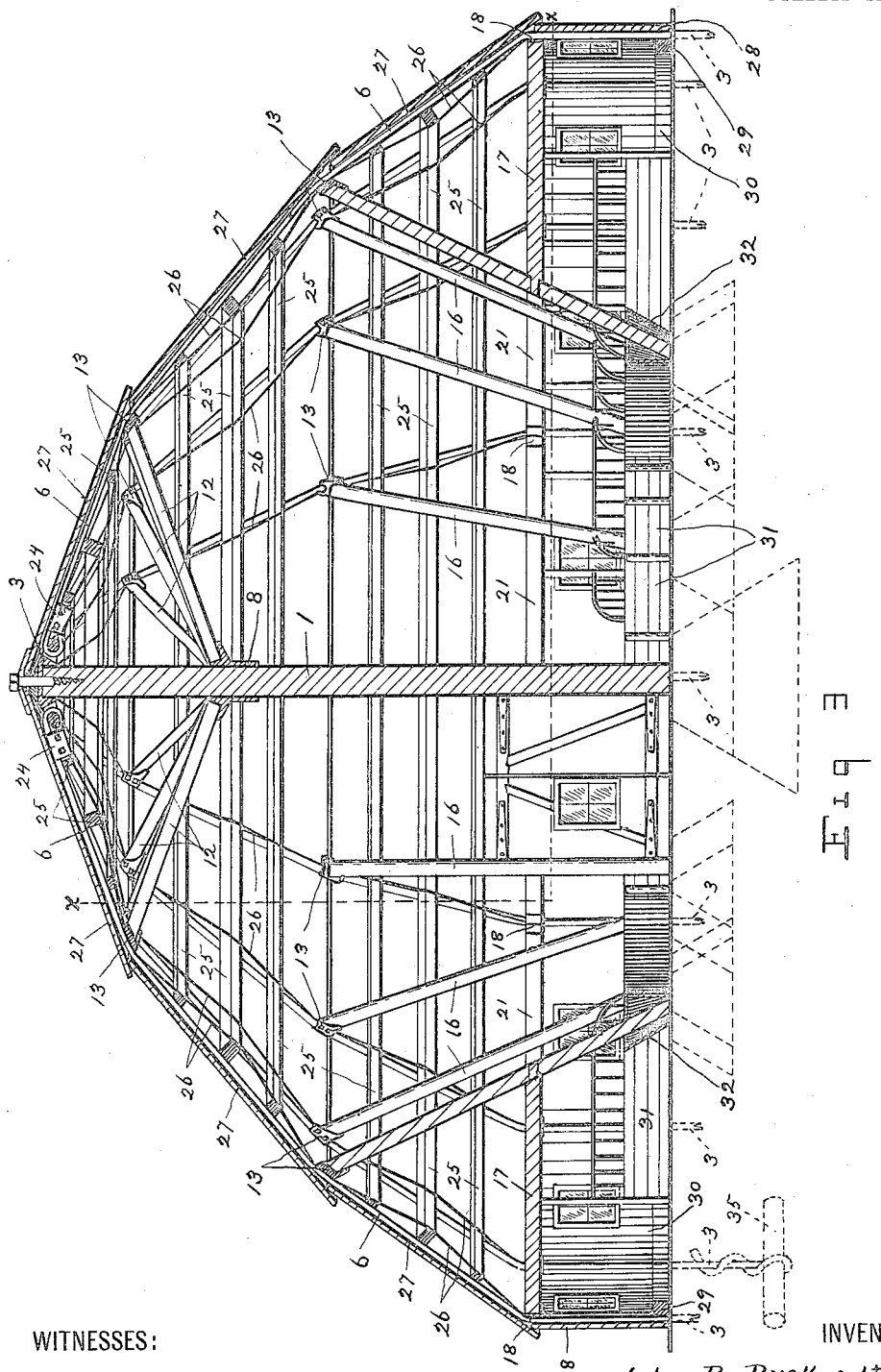
Figure 4:
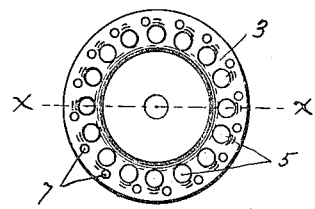
Figure 5:
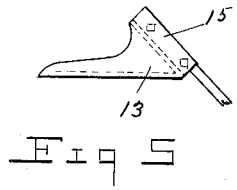
Figure 6:
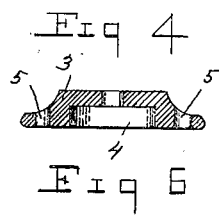
Figure 7:
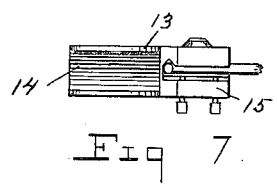
Figure 8:
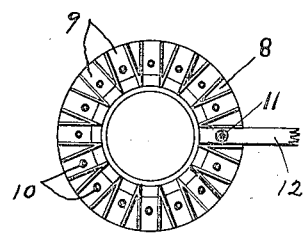
Figure 9:
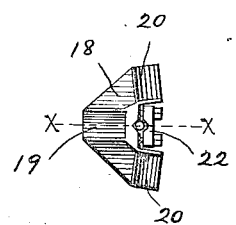
Figure 10:
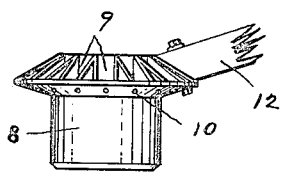
Figure 11:
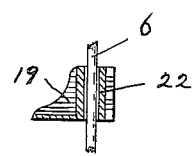

Referring to the accompanying drawings forming a part of this application:—Figure 1, is an outside elevation of a barn, showing my novel construction. Fig. 2, is a top plan view of one-half of the structure, shown partly in section, taken on the line X—X of Fig. 3. Fig. 3, is a vertical sectional view of the barn, taken on the center line. Fig. 4, is a detail plan view of the top central cable ring to which the guy cables are secured. Fig. 5, is a detail side elevation of one of the top and intermediate clamps used to secure the cables to the brace timbers. Fig. 6, is a sectional view of Fig. 4, on the line X—X. Fig. 7, is a top plan view of Fig. 5. Fig. 8, is a detail top plan view of the brace ring. Fig. 9, is a detail top plan view of one of the bottom brace and cable clamps. Fig. 10, is a side elevation of Fig. 8. Fig. 11, is a sectional view of Fig. 9, on the line X—X.

Referring to the drawings, 1, indicates a vertical central post or which may be in the form of a silo which is set upon a suitable base of concrete or other suitable material; while to the top of said post 1, is secured the cable ring 3, which is formed with the circular central orifice 4, in its lower face for the reception of the end of said post 1; and its body near the edge thereof, is further provided with the orifices 5, within which the main guy-ropes 6, are secured; and the smaller orifices 7, within which the truss-wires are secured.

At a suitable distance below the upper end of said post 1, encircling the same and secured thereto, is the brace-ring 8, which is formed with the brace sockets 9, and the orifices 10, for the reception of the attaching bolts 11, which secure the lower ends of the brace rods 12, in a radial manner therefrom, and which have secured upon their outer ends the clamps 13, which are formed with the socket 14, within which the end of said brace rod 12, is secured and the clamp wire-socket 15.

Surrounding the post 1, and at a suitable distance therefrom are placed the brace posts 16, with their lower ends embedded in suitable bases and their upper ends inclined outward and capped by the clamps 13; while to said brace posts 16, are also secured the inner ends of the horizontal beams 17, each of which has secured upon its outer end the clamp 18, which is formed with the socket 19, within which said beams 17, are secured, and the sockets 20, within which the ends of the connecting beams 21, are secured; while between said sockets 20, is provided the cable clamp 22.

The guy-cables 6, having their upper ends secured within the orifices 4, in the ring 3, by the clamps 24, they are carried downward through the clamps 13, within the wire socket 15, to which they are secured and thence downward through the clamp 18, within the cable clamp 22, to which they are secured, and so to the anchor 35, which is suitably secured in the ground; and in this manner the central post 1, is held by the guy-cables 6, having their ends secured to anchors and being suitably braced from said post. Upon the under side of said guy-cables 6, are secured the concentric horizontal roof supports 25, which are further braced by the truss-wires 26, which have their upper ends secured in the orifices 7, in the ring 3, and which pass under the supports 25, and are secured in the clamps 13, and 18. Upon this framework composed of the guy-cables 6, and the supports 25, the roofing boards 27, are secured and capped by the plate 34; and the siding 28, is secured to the connecting beams 21, which serve as a plate, and to a suitable sill 29.

Within the barn is provided the encircling passage 30, the radial stalls 31, and the feed trough 32, which leaves the entire central portion of the barn and space above stalls available for storage, with the exception of the drive-way 33, which can also be filled if desired.

Having thus described my invention what I claim as new and desire to secure by Letters Patent is:—

1. A barn of the class described, comprising a central post, guy-cables radiating from said post and having their upper ends secured to said post and their lower ends anchored in the ground, braces having their inner ends secured to said central post and their outer ends secured to said guy-cables, supporting posts resting upon the ground with their upper ends secured to said guy-cables, roof-supporting beams secured to said guy-cables and roofing material secured upon said supporting beams.

2. In a circular barn of the class described, the combination with a central post, of guy-cables radiating from the upper end of said post and adapted to have their lower ends anchored within the ground, means for bracing said cables from said central post, means for bracing said cables from the ground, and means for securing a roofing material upon said cables.

In testimony whereof I affix my signature in presence of two witnesses.

JOHN R. BUCKWALTER.

Witnesses:
H. J. SMITH,
THOS. L. BANKS.